United States Patent
Goetz (10) Patent No.: US 9,374,411 B1
(45) Date of Patent: Jun. 21, 2016

(54) CONTENT RECOMMENDATIONS USING DEEP DATA

(71) Applicant: Amazon Technologies, Inc., Reno, NV (US)

(72) Inventor: Jeromey Russell Goetz, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 238 days.

(21) Appl. No.: 13/848,305

(22) Filed: Mar. 21, 2013

(51) Int. Cl.
*G06F 15/16* (2006.01)
*H04L 29/08* (2006.01)
*G06F 17/30* (2006.01)
*G06Q 30/06* (2012.01)

(52) U.S. Cl.
CPC .......... *H04L 67/02* (2013.01); *G06F 17/30064* (2013.01); *G06F 17/30867* (2013.01); *G06Q 30/0631* (2013.01)

(58) Field of Classification Search
CPC .. G06F 17/30017–17/30064; G06F 17/30867; G06Q 30/0251–30/0256; G06Q 30/0631
USPC .......... 709/231; 725/14–21, 44–47; 705/14.49–14.54, 26.7
See application file for complete search history.

(56) References Cited

U.S. PATENT DOCUMENTS

| | | | |
|---|---|---|---|
| 5,596,705 A | 1/1997 | Reimer et al. | |
| 5,692,212 A | 11/1997 | Roach | |
| 6,029,195 A * | 2/2000 | Herz | 725/116 |
| 6,065,042 A | 5/2000 | Reimer et al. | |
| 6,602,297 B1 * | 8/2003 | Song | 715/210 |
| 7,293,275 B1 | 11/2007 | Krieger et al. | |
| 7,966,632 B1 * | 6/2011 | Pan et al. | 725/46 |
| 8,209,396 B1 | 6/2012 | Raman et al. | |
| 8,220,022 B1 * | 7/2012 | Pan et al. | 725/46 |
| 8,260,117 B1 * | 9/2012 | Xu et al. | 386/262 |
| 8,356,248 B1 * | 1/2013 | Killalea | 715/273 |
| 8,554,640 B1 * | 10/2013 | Dykstra et al. | 705/26.7 |
| 8,572,097 B1 * | 10/2013 | Payne et al. | 707/748 |
| 8,644,702 B1 | 2/2014 | Kalajan | |
| 8,688,712 B1 * | 4/2014 | Klara | 707/748 |
| 8,689,255 B1 | 4/2014 | Gregov et al. | |
| 8,763,041 B2 | 6/2014 | Timmermann et al. | |
| 8,955,021 B1 | 2/2015 | Treder et al. | |
| 9,113,128 B1 | 8/2015 | Aliverti et al. | |
| 2002/0059610 A1 | 5/2002 | Ellis | |
| 2003/0106058 A1 * | 6/2003 | Zimmerman et al. | 725/46 |
| 2005/0160465 A1 | 7/2005 | Walker | |

(Continued)

OTHER PUBLICATIONS

U.S. Appl. No. 14/034,055 entitled "Playback of Content Using Multiple Devices", filed Sep. 23, 2013.

(Continued)

*Primary Examiner* — Emmanuel L Moise
*Assistant Examiner* — Julian Chang
(74) *Attorney, Agent, or Firm* — Thomas | Horstemeyer, LLP (57) ABSTRACT

Disclosed are various embodiments for recommending content for users. A user is associated with a user preferred character that is represented in a first network content. A library is referenced to identify a recommended character based at least upon the user preferred character, the recommended character being represented in a second network content, the library associating the preferred character to the recommended character according to a relationship score. A recommendation is sent for presentation of the second network content.

25 Claims, 7 Drawing Sheets

(56) References Cited

U.S. PATENT DOCUMENTS

| | | | |
|---|---|---|---|
| 2005/0193002 A1* | 9/2005 | Souders et al. | 707/103 X |
| 2006/0271836 A1 | 11/2006 | Morford et al. | |
| 2007/0078828 A1* | 4/2007 | Parikh et al. | 707/3 |
| 2008/0002021 A1 | 1/2008 | Guo et al. | |
| 2008/0066135 A1 | 3/2008 | Brodersen et al. | |
| 2008/0172293 A1 | 7/2008 | Raskin et al. | |
| 2008/0209465 A1 | 8/2008 | Thomas et al. | |
| 2008/0250080 A1* | 10/2008 | Arrasvuori et al. | 707/203 |
| 2008/0256579 A1* | 10/2008 | Verhaegh et al. | 725/46 |
| 2008/0271078 A1* | 10/2008 | Gossweiler et al. | 725/40 |
| 2009/0006373 A1* | 1/2009 | Chakrabarti et al. | 707/5 |
| 2009/0006374 A1* | 1/2009 | Kim et al. | 707/5 |
| 2009/0006398 A1* | 1/2009 | Lam et al. | 707/7 |
| 2009/0043725 A1* | 2/2009 | Gutta | 706/54 |
| 2009/0094113 A1 | 4/2009 | Berry et al. | |
| 2009/0106659 A1* | 4/2009 | Rosser | G06F 17/30056 715/730 |
| 2009/0138906 A1 | 5/2009 | Eide et al. | |
| 2009/0216563 A1* | 8/2009 | Sandoval et al. | 705/3 |
| 2009/0216639 A1* | 8/2009 | Kapczynski et al. | 705/14 |
| 2009/0271826 A1* | 10/2009 | Lee et al. | 725/46 |
| 2010/0082585 A1* | 4/2010 | Barsook | G06F 17/3079 707/706 |
| 2010/0153831 A1 | 6/2010 | Beaton | |
| 2010/0161541 A1* | 6/2010 | Covannon et al. | 706/47 |
| 2010/0199219 A1 | 8/2010 | Poniatowski et al. | |
| 2010/0251304 A1* | 9/2010 | Donoghue | H04N 21/25891 725/46 |
| 2010/0293190 A1* | 11/2010 | Kaiser et al. | 707/769 |
| 2011/0067061 A1 | 3/2011 | Karaoguz et al. | |
| 2011/0246495 A1 | 10/2011 | Mallinson | |
| 2011/0264682 A1* | 10/2011 | Song et al. | 707/769 |
| 2011/0276563 A1* | 11/2011 | Sandoval et al. | 707/723 |
| 2011/0282759 A1* | 11/2011 | Levin | G06Q 30/02 705/26.41 |
| 2011/0282906 A1 | 11/2011 | Wong | |
| 2011/0302240 A1* | 12/2011 | Saito et al. | 709/203 |
| 2012/0072953 A1 | 3/2012 | James et al. | |
| 2012/0124071 A1* | 5/2012 | Gebhard et al. | 707/767 |
| 2012/0136825 A1* | 5/2012 | Harris | A63F 13/12 707/608 |
| 2012/0151530 A1 | 6/2012 | Krieger et al. | |
| 2012/0158706 A1* | 6/2012 | Story, Jr. | G06F 17/3005 707/723 |
| 2012/0167141 A1* | 6/2012 | Arora | 725/40 |
| 2012/0222058 A1* | 8/2012 | el Kalíouby et al. | 725/10 |
| 2012/0308202 A1 | 12/2012 | Murata et al. | |
| 2012/0317136 A1* | 12/2012 | Papish et al. | 707/769 |
| 2013/0014155 A1 | 1/2013 | Clarke et al. | |
| 2013/0035086 A1* | 2/2013 | Chardon et al. | 455/420 |
| 2013/0060660 A1 | 3/2013 | Maskatia et al. | |
| 2013/0080260 A1* | 3/2013 | French et al. | 705/14.66 |
| 2013/0138585 A1* | 5/2013 | Forte | 706/12 |
| 2013/0262619 A1* | 10/2013 | Goodwin | G06F 17/30029 709/217 |
| 2014/0032565 A1* | 1/2014 | Parker | 707/741 |
| 2014/0068670 A1 | 3/2014 | Timmermann et al. | |
| 2014/0074828 A1* | 3/2014 | Mathur | 707/723 |
| 2014/0143720 A1* | 5/2014 | Dimarco et al. | 715/810 |
| 2014/0173660 A1* | 6/2014 | Correa et al. | 725/42 |
| 2014/0188926 A1* | 7/2014 | Chandel et al. | 707/767 |
| 2014/0208355 A1 | 7/2014 | Gregov et al. | |
| 2014/0245336 A1* | 8/2014 | Lewis et al. | 725/14 |
| 2015/0156562 A1 | 6/2015 | Treder et al. | |
| 2015/0357001 A1 | 12/2015 | Aliverti et al. | |

OTHER PUBLICATIONS

U.S. Appl. No. 13/927,970 entitled "Providing Soundtrack Information During Playback of Video Content", filed Jun. 26, 2013.

U.S. Appl. No. 13/709,768 entitled "Providing Content Via Multiple Display Devices", filed Dec. 10, 2012.

U.S. Appl. No. 13/778,846 entitled "Shopping Experience Using Multiple Computing Devices", filed Feb. 27, 2013.

"Wii U GamePad," Wii U Official Site—Features, retrieved from "http:I/www.nintendo.com/wiiu/features/," retrieved Dec. 4, 2012.

"Entertainment is more amazing with Xbox SmartGiass," Xbox SmartGiass 1 Companion Application—Xbox.com, retrieved from "http:I/www.xbox.com/en-US/smartglass," retrieved Dec. 4, 2012.

"Sony Pictures to smarten up Blu-ray with MovieIQ, the 'killer app for BD-Live,'" Engadget, retrieved from http://www.engadget.com/2009/06/18/sony-pictures-to-smarten-up-blu-ray-with-movieiq-the-killer-ap/, Jun. 18, 2009.

"Hulu 'Face Match' feature attaches an actor's entire history to their mug," Engadget, retrieved from http://www.engadget.com/2011/12/08/hulu-face-match-feature-attaches-an-actors-entire-h istory-to/, Dec. 8, 2011.

"TVPius for the iPad," iTunes Store, retrieved from "http://itunes.apple.com/us/app/tvplus/id444774882?mt=B," updated Apr. 13, 2012.

International Searching Authority and Written Opinion mailed Mar. 21, 2014 for PCT/US2013/057543 filed Aug. 30, 2013.

* cited by examiner

CONTENT RECOMMENDATIONS USING DEEP DATA

BACKGROUND

People may want to access media content such as audio/video, electronic books (e-books), and/or audio books over a network. To find such content, people may search for content and make selections based on search results. The content may include a variety of characters that progress the storyline or plot of the content. It may be the case that a user finds himself/herself favoring or preferring particular fictional characters based on his/her subjective tastes.

BRIEF DESCRIPTION OF THE DRAWINGS

Many aspects of the present disclosure can be better understood with reference to the following drawings. The components in the drawings are not necessarily to drawn scale, with emphasis instead being placed upon clearly illustrating the principles of the disclosure. Moreover, in the drawings, like reference numerals designate corresponding parts throughout the several views.

DETAILED DESCRIPTION

The present disclosure relates to identifying and recommending content for users. Users may access a variety of content offered by a content delivery service over a network. As users play or otherwise interact with the content, the content delivery service may obtain implicit or explicit user feedback. This feedback may express aspects of the content that a user approves, supports, likes, or favors. For example, the content delivery service may determine that a user favors particular characters associated with the content. Based on this feedback, the content delivery service may identify similar characters associated with other content. Accordingly the content delivery service may generate recommendations for other content to the user.

Various embodiments of the present disclosure are directed to presenting content to a user and collecting user interaction data with respect to the presented content. Based on this user interaction data, it may be determined whether a user prefers/favors a particular character. By collecting user interaction data across a variety of users, trends and relationships between characters represented in a corpus of content may be determined.

Figure 1:
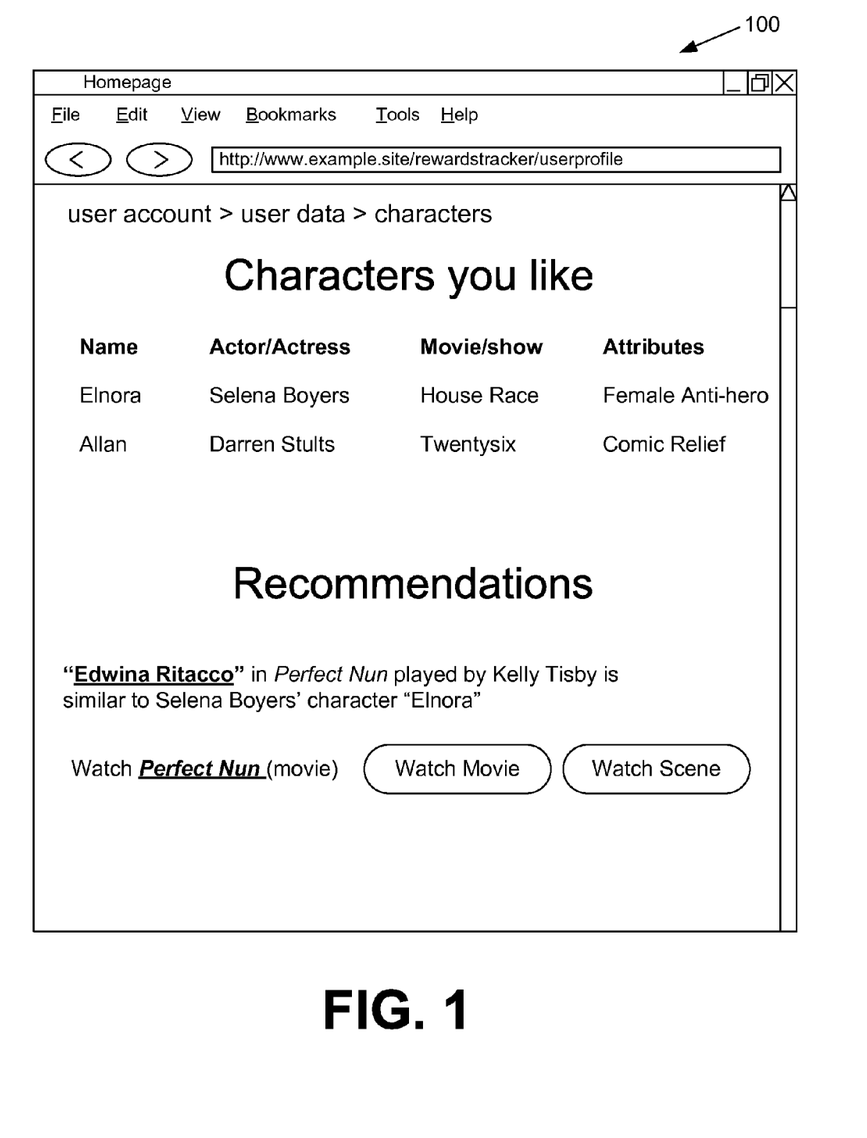
FIG. 1 is a drawing of a user interface according to various embodiments of the present disclosure.

With reference to FIG. 1, shown is a drawing of a user interface 100 according to various embodiments of the present disclosure. The user interface 100 may be presented to a user who has accessed content over a network. User interaction data may be collected for the user as the user plays back or causes rendition of the content. For example, the user may explicitly indicate that he/she favors particular characters such as "Elnora" or "Allan." The user interface 100 presents details about the preferences and tastes of the user. As a non-limiting example, the user interface 100 presents to the user information such as the actor/actress that represents the character, the format of the content (e.g., movie, television show, e-book, etc.), various attributes associated with the character, or any other details about the character.

The user may also implicitly indicate that he/she favors/prefers a character by selecting particular scenes associated with the content, bookmarking the content, tagging portions of the content, purchasing/consuming products associated with a character, etc. To this end, characters preferred by a user may be associated with a particular user.

The user interface 100 further presents recommendations for other content to the user. According to various embodiments, recommendations are generated based at least upon associating a user's preferred character to a recommended character. A recommended character is a character who has a degree of commonality with respect to a user preferred character, where the degree of commonality exceeds a threshold amount. In this respect, a character who is similar to a user preferred character is identified. By identifying similar characters, recommendations for content associated with the similar character may be generated.

In various embodiments, the user interface 100 presents a recommended character to the user. The user interface 100 also presents recommended content that is associated with the recommended character. Furthermore, the user interface 100 provides an opportunity for the user to play or render the recommended content or to play a scene associated with the recommended character. A scene, for example, is a portion of a video content feature, where the scene has a predetermined start point and stop point along a timeline of the video content feature. In the following discussion, a general description of the system and its components is provided, followed by a discussion of the operation of the same.

Figure 2:
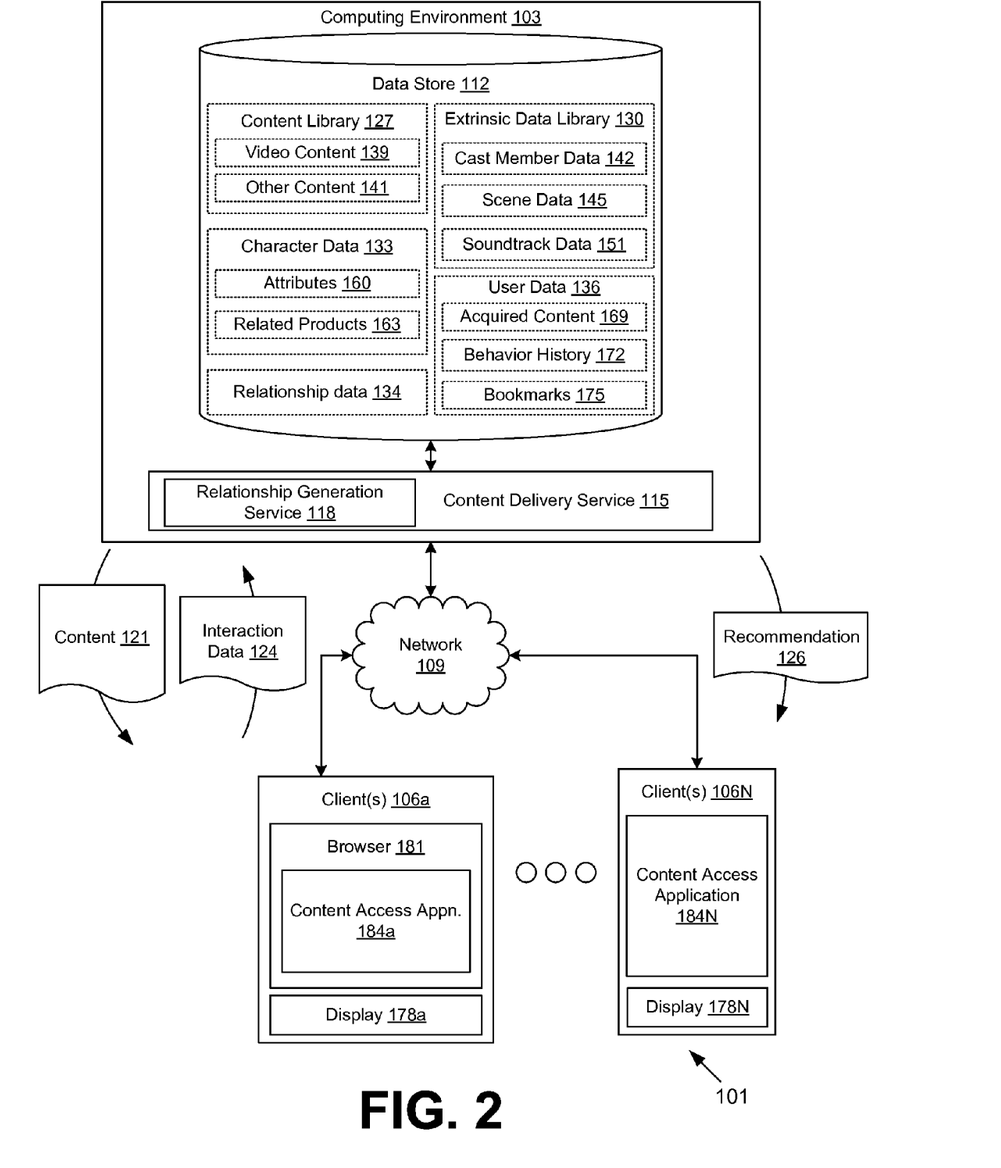
FIG. 2 is a drawing of a networked environment according to various embodiments of the present disclosure.

With reference to FIG. 2, shown is a networked environment 101 according to various embodiments. The networked environment 101 includes a computing environment 103 and a plurality of clients 106a . . . 106N in data communication via a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may employ a plurality of computing devices that may be arranged, for example, in one or more server banks, computer banks, or other arrangements. Such computing devices may be located in a single installation or may be distributed among many different geographical locations. For example, the computing environment 103 may include a plurality of computing devices that together may comprise a cloud computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112 is associated with, for example, the operation of the various applications and/or functional entities described below.

The components executed on the computing environment 103 include, for example, a content delivery service 115 and other applications, services, processes, systems, engines, or functionality not discussed in detail herein. The content delivery service 115 is executed to serve up or stream video content, multimedia content, or any other content to clients 106. The content delivery service 115 may support a resume functionality such that a playback of video content may be stopped at a point in the video content on one device and later resumed at that point on the same device or a different device. The content delivery service 115 may be configured to send extrinsic data to the clients 106 accompanying the content 121. The content 121 may comprise, for example, a movie, television show, e-book, audio book, or any other multimedia.

The content delivery service 115 may generate a collection of extrinsic data to be sent to the client 106 along with initial portions of the content 121. Extrinsic data may comprise information relating to the content such as, for example, actors/actresses on the screen, details about a presently displayed scene, information about background music, etc. In sending extrinsic data, the content delivery service 115 may be configured to compress the collection of extrinsic data.

Furthermore, the content delivery service 115 may be configured to capture user interaction data 124. User interaction data 124 may comprise inputs, commands, instructions, feedback, or any other types of interaction relating to the presentation or rendition of content 121. For example, a user may execute actions such as pausing, replaying, forwarding, adjusting the volume, bookmarking, tagging, deep tagging, providing explicit feedback, etc. These actions may be captured by the content delivery service 115 as user interaction data 124.

The content delivery service 115 may comprise a relationship generation service 118. According to various embodiments, the relationship generation service 118 is configured to quantify a relationship between various characters associated with a corpus of content presented to users. In this respect, the relationship generation service 118 identifies those characters that are similar with respect to one another. The relationship generation service 118 analyzes user interaction data 124 to generate relationship scores as is discussed in further detail below.

The content delivery service 115 is configured to generate one or more recommendations 126 for users. Recommendations 126 may be directed towards identifying content that is customized for a particular user's taste.

The data stored in the data store 112 includes, for example, a content library 127, an extrinsic data library 130, character data 133, user data 136, relationship data 134, and potentially other data. The content library 127 may include content 121 such as, for example, multiple video content features 139. Non-limiting examples of video content features 139 include movies, television shows, video clips, and/or other forms of video content. Although described as "video content," it is understood that the video content features 139 may include accompanying audio, closed captioning text, and/or other data. The content library 127 may also include other content 141 such as, for example, audio books, electronic books, or any multimedia content.

The extrinsic data library 130 includes various extrinsic data items that are associated with the content 121 stored in the content library 127. Non-limiting examples of the extrinsic data items may include names or descriptions of performers in the video content features 139 or other content 141, biographies or filmographies of the performers, commentary, trivia, mistakes, user comments, images, and/or other data. The extrinsic data items may include curated data that is professionally managed, verified, or is otherwise trustworthy.

For example, the extrinsic data library 130 may include cast member data 142, scene data 145, soundtrack data 151, and/or other data. The cast member data 142 may include the name, images, and/or other data describing cast members who perform in a video content feature 139. The term "cast member" may in some cases encompass additional participants in a video content feature 139, such as, for example, crew members.

The scene data 145 divides a video content feature 139 into multiple scenes. A scene corresponds to a period of time in the video content feature 139 having multiple frames and may be determined as having a distinct plot element or setting. The scene data 145 may identify the cast members and/or characters who are associated with a given scene. In some cases, the scene data 145 may record the times when the cast members or characters first appear in the scene, last appear in the scene, or are on-screen. In some embodiments, the times may be represented as a frame number, or a range of frame numbers, in the video content feature 139. The soundtrack data 151 may include information about the audio of the video content feature 139. For example, the soundtrack data 151 may identify that a particular audio track is being used at a certain time in the video content feature 139 or during a certain scene of the video content feature 139. In addition, the soundtrack data 151 may identify performers who vocally perform characters in the audio. Such performers may be considered cast members.

The character data 133 may include information about characters in video content features 139. According to various embodiments, a character comprises a fictional character. A fictional character may be represented by a corresponding cast member. A fictional character represents an aspect of a plot or story that may or may not be associated with a cast member. A cast member may be an actor/actress who portrays the character either through voice and/or through acting. Character data 133 for a particular character may comprise one or more attributes 160. Attributes 160 describe a type of character (e.g., hero, villain, anti-hero, comic relief character, etc.), personality traits of the character, physical or mental attributes of the character, or any other character attributes. In addition, character data 133 comprises data for related products 163. A related product 163 may comprise any merchandise or item sold via an electronic commerce system that is associated with a particular character. For example, a character may be associated with an action figure, movie poster, bobble head, or any other item for purchase/consumption.

The user data 136 includes various data about users of the content delivery service 115. The user data 136 may include acquired content 169, behavior history 172, bookmarks 175, and/or other data. The acquired content 169 describes to which content in the content library 127 a user has access. For example, a user may have rented or otherwise consumes a particular video content feature 139. In some cases, a user may have a subscription that provides access to all or some of the video content features 139. Such a subscription may be limited in some way (e.g., number of titles, number of bytes, quality level, time of day, etc.) or unlimited.

The behavior history 172 may include the user interaction data 124 that has been captured. To this end, the behavior history 172 may include a consumption history, a browsing history, a view history, explicitly configured viewing preferences, and/or other data. The bookmarks 175 correspond to specific times or scenes in a video content feature 139 that the user has indicated to be interesting and worthy of returning to in the future. Bookmarks 175 may include user tags associated with particular scenes or chapters of a content 121.

Relationship data 134 may comprise data expressing various relationships or trends determined by the relationship generation service 118. For example, a relationship score may be determined for quantifying a degree of commonality between two or more cast members, characters, scenes, etc. The relationship data 134 may comprise various statistical models, histograms, or any other mathematical trends, as is discussed in further detail below.

The clients 106 are representative of a plurality of client devices that may be coupled to the network 109. Each client 106 may comprise, for example, a processor-based system such as a computer system. Such a computer system may be embodied in the form of a smart television, a desktop computer, a laptop computer, personal digital assistants, cellular telephones, smartphones, set-top boxes, music players, web pads, tablet computer systems, game consoles, electronic book readers, or other devices with like capability. Each client 106 may include one or more displays 178a . . . 178N. Each display 178 may comprise, for example, one or more devices such as liquid crystal displays (LCDs), gas plasma-based flat panel displays, organic light emitting diode (OLED) displays, LCD projectors, or other types of display devices. In some embodiments, the displays 178 may correspond to touch-screen displays.

Each client 106 may be configured to execute various applications such as a browser 181, a respective one of a plurality of content access applications 184a . . . 184N, and/or other applications. The browser 181 may be executed in a client 106, for example, to access network content served up by the computing environment 103 and/or other servers, thereby rendering a user interface on the display 178 such as, for example, the user interface 100 of FIG. 1. The content access application 184 is executed to obtain content 121 from the content delivery service 115 and to render the video content features 139 or other content 141 on the display 178. Additionally, the content access application 184 may be configured to obtain extrinsic data from the content access application 184 and to render a user interface based at least in part on the extrinsic data to enhance the user experience in viewing the video content feature 139. In addition, the content access application 184 may include various tools for allowing a user to interact with the playback or rendition of content 121 received over the network 109.

In some cases, the video content feature 139 may be rendered on a different display 178 (of the same or different client 106) from the user interface. In one embodiment, the content access application 184 may be a plug-in of the browser 181 or otherwise executed in the environment of the browser 181. The clients 106 may be configured to execute other applications such as, for example, mobile applications, email applications, social networking applications, etc.

Next, a general description of the operation of the various components of the networked environment 101 is provided. To begin, a user may acquire rights to view content 121 in a content library 127. A client 106 associated with a user may request to stream or download a video content feature 139 or other content 141 from the content delivery service 115.

The content access application 184 of the client 106 renders the content 121 on the display 178. The content access application 184 may also render various user interfaces on the display 178 using extrinsic data to enhance the user experience. The user interfaces may allow users to quickly learn the cast members and/or characters who are on screen while the content 121 is presented. The user interfaces may be dynamically updated as the content 121 progresses in the foreground or in the background. Non-limiting examples of such user interfaces are shown and will be described in connection with at least FIG. 3.

The content delivery service 115 is configured to encode for display one or more user interfaces at the client 106. One feature of the user interfaces may solicit feedback from a user with respect to the presentation or rendition of content 121. In this case, a user may explicitly specify a user sentiment towards aspects of the content 121. For example, the user may indicate whether he/she favors a cast member, a character, a scene, or any other aspect of the content 121. Accordingly, the content delivery service 115 may capture this feedback as user interaction data 124. In addition, the actions of the user who purchases particular items, consumes digital content, or browses websites may be tracked by the content delivery service 115. The user interaction data 124 may be stored as behavior history 172.

A relationship generation service 118 is configured to analyze the user interaction data 124 to identify any trends or relationships expressed in the data. Analyzing a user group's preference towards preferred actors/actresses may yield different results than analyzing the user group's preference towards preferred characters. For example, sentiments towards a specific actress may lead to a different trend than sentiments towards a fictional character portrayed by the specific actress. Accordingly, the relationship generation service 118 may analyze data relating to cast members separately from data relating to characters.

For a particular user, the relationship generation service 118 may be configured to identify those characters who the particular user finds preferable. For example, the relationship generation service 118 may determine that a particular user prefers the character "Elnora" in the television show "House Race" and also prefers the character "Edwina" in the movie "Perfect Nun." The relationship generation service 118 may track instances where the same user prefers these two characters. In response to the occurrence of these instances, the relationship generation service 118 updates a relationship score that quantifies a degree of commonality between the character "Elnora" and the character "Edwina." For example, the relationship score may be based at least upon the quantity of users who express a preference towards both these characters.

The relationship data 134 may comprise multiple relationship scores, where each relationship score indicates whether two or more characters are similar with respect to one another. To this end, as the content delivery service 115 obtains more user interaction data 124, the relationship generation service 118 may dynamically update the relationship data 134 to reflect any trends in user sentiment towards characters, cast members, scenes, etc.

The content delivery service 115 may generate a recommendation 126 for a user based at least upon a relationship score. In a non-limiting example, a relationship score quantifying a degree of commonality between the character "Elnora" and the character "Edwina" indicates that many users who prefer the character "Elnora" also prefer the character "Edwina." In the case that the content delivery service 115 determines that a particular user prefers the character "Elnora," the content delivery service 115 generates a recommendation 126 for the character "Edwina." The recommendation 126 may be presented to the particular user as text in a user interface 100 (FIG. 1), where the text identifies the character "Edwina." The recommendation 126 may also specify recommended content that is associated with the character "Edwina." According to various embodiments, the recommendation 126 comprises a link for allowing the particular user to access the recommended content or a scene associated with the recommended content.

While the non-limiting example of FIG. 2 depicts a content delivery service 115 executed in a computing environment 103 that delivers content 121 to a client 106, various embodiments of the present disclosure are not so limited. One or more embodiments of the presentation disclosure comprises a content delivery service 115 that is executable in the client such that the content delivery service 115 presents content locally stored in the client 106. For example, the content delivery service 115 may comprise a media player that plays/renders downloaded or locally stored content for display to a user of the client 106. In this example, it may be the case that the client 106 plays back content 121 via the content delivery service 115 without a broadband network connection. Furthermore, in other embodiments, portions of the content delivery service 115 are executed by the client 106 for presenting content 121 to a user.

Figure 3:
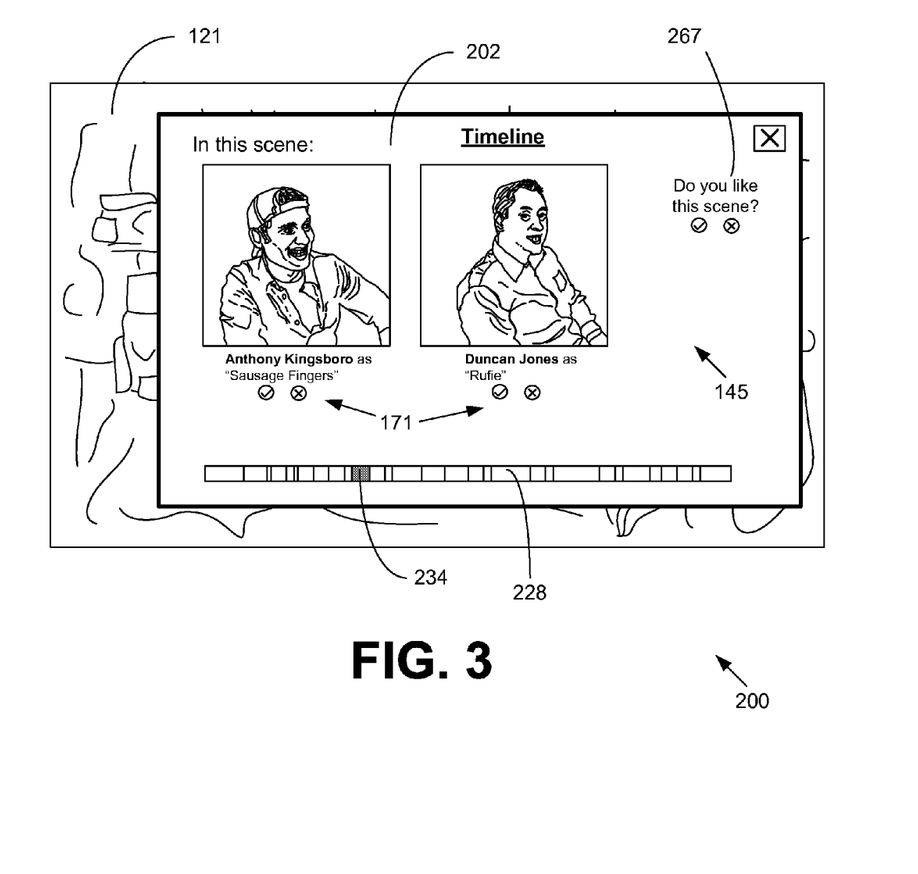
FIG. 3 is a drawing of an example of content and user interfaces rendered by a client in the networked environment of FIG. 2 according to various embodiments of the present disclosure.

Referring next to FIG. 3, shown is one example of content 121 rendered on a display 178 (FIG. 2) of a client 106 (FIG. 2) in the networked environment 101 (FIG. 2) according to various embodiments. The content 121 may be streamed over the network 109 (FIG. 2) or previously downloaded to the client 106. The content 121 is presented to a user in a user interface 200. The non-limiting example of FIG. 3 depicts content 121 that is a video content feature 139 (FIG. 2).

The user interface 200 may include a timeline user interface 202 rendered on top of the content 121 on the display 178 of a client 106. The timeline user interface 202 partially obscures the content 121 in this example. In some cases, the visible portion of the content 121 may be darkened or dimmed. In other examples, the timeline user interface 202 may fully cover the content 121. In other examples, the timeline user interface 202 may be rendered adjacent to the presented content 121. In still other examples, the timeline user interface 202 may be rendered on a different display 178 and potentially by a different client 106 (FIG. 2).

The timeline user interface 202 may be invoked by the user providing a pause command or other command, moving a mouse, tapping on or making a gesture relative to a touchscreen, selecting a button on a remote control, or another approach. In one embodiment, the timeline user interface 202 may appear for a short time when the content 121 is started and then may disappear. When the timeline user interface 202 is shown, the content 121 may continue the playback in the background or may be paused. In this non-limiting example, the content 121 continues the playback and a pause control is rendered. A playback slider control may be provided to indicate the current position in the content 121 and to facilitate seeking or cueing by the user to another position in the content 121. Volume controls, fast forward controls, reverse controls, and/or other controls may be provided in other examples.

According to various embodiments, the timeline user interface 202 visually represents a video content feature 139 and visually segments the video content feature 139 into multiple scenes 228. It is noted that such scenes 228 may be non-contiguous. To this end, the user interface 202 may include a sequential play component, the selection of which launches the sequential play of the subset of the scenes 228. The timeline user interface 202 may visually depict that a current scene 234 is presently being presented to a user. The current scene 234 may be indicated on the timeline user interface 202 by way of highlighting.

The timeline user interface 202 may present scene data 145, character data 133 (FIG. 2), or any other extrinsic data. For example, the timeline user interface 202 may identify those actors/actresses as well as those characters who are associated with the content 121 or the current scene 234.

According to various embodiments, the timeline user interface 202 is configured to obtain feedback data to determine the user's sentiment towards aspects of the presented content 121. For example, the timeline user interface 202 may include a scene feedback interface 267. Through the scene feedback interface 267, a user may explicitly indicate whether he or she favors/prefers the current scene 234. The timeline user interface 202 may also include a character feedback interface 171 for allowing users to indicate whether they prefer a particular character. Although not shown in the non-limiting example of FIG. 3, the timeline user interface 202 may also include an interface for obtaining feedback for actors/actresses. Thus, a content delivery service 115 (FIG. 2) may obtain user interaction data 124 (FIG. 2) via utilization of at least the scene feedback interface 267 or the character feedback interface 171. To this end, user interaction data 124 may be obtained during a playback of the content 121 by the user.

Figure 4:
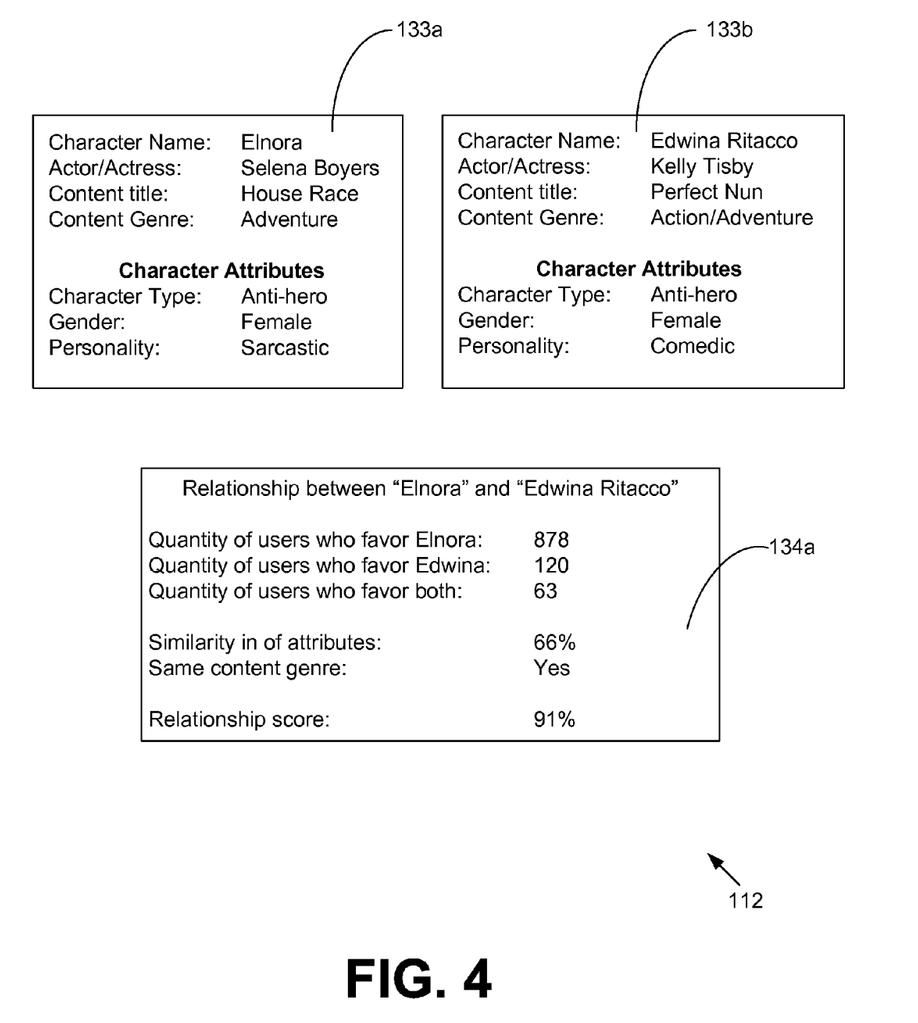
FIG. 4 is a drawing of an example of data stored in the data store in the networked environment of FIG. 2 according to various embodiments of the present disclosure.

Turning next to FIG. 4, shown is a drawing of an example of data stored in the data store 112 in the networked environment 101 of FIG. 2 according to various embodiments of the present disclosure. In the non-limiting example of FIG. 4, character data 133a is stored for the character "Elnora" and character data 133b is stored for the character "Edwina." Character data 133 for characters may include a name or identifier for the character, an actor/actress that represents the character, a title or name of the content 121 (FIG. 2) associated with the character, a genre of the content, or any other information relating to the character. To this end, the character data 133 may represent a character profile for a character.

In addition, character data 133 may include attributes 160 (FIG. 2) for a character. Attributes 160 may comprise, for example, the character type, the character gender, one or more personality traits, physical characteristics, or any other qualities of a character. In various embodiments, users may generate, edit, and update the character data 133 for the character. For example, crowd sourcing may be used to allow users to populate various fields of the character profile.

The data store 112 may also include relationship data 134. A content delivery service 115 (FIG. 2) may obtain user interaction data 124 (FIG. 2) from one or more users. The user interaction data 124 may implicitly or explicitly express user sentiment towards aspects of content 121 (FIG. 2), where an aspect may be, for example, a character associated with the content 121. The user interaction data 124 may be stored in the data store 112 as behavior history 172 (FIG. 2). The relationship generation service 118 may analyze the behavior history 172 to identify relationships or trends expressed in the user interaction data 124.

For example, the relationship generation service 118 may generate a relationship score that quantifies a degree of commonality between a first character and the second character.

In the non-limiting example FIG. 4, a relationship generation service 118 determines a relationship score that quantifies the degree of commonality between the character "Elnora" and the character "Edwina." The relationship generation service 118 may analyze various factors in determining this relationship score. Non-limiting examples of such factors include the quantity of users who favor the character "Elnora," the quantity of users who favor the character "Edwina," the quantity of users who favor both the characters "Elnora" and "Edwina," a degree of similarity in the attributes 160 for each of the characters "Elnora" and "Edwina," a similarity in genre associated with each character, or any other factor that may indicate a similarity or commonality between the two characters.

For example, of the users who favor the character "Edwina" (e.g., 120), more than half (e.g., 63) also favor the character "Elnora." This implies a significant degree of commonality between the two characters. This may be translated into a quantitative assessment of the degree of commonality, as shown in the relationship score. The relationship score may comprise a weighted sum of the factors discussed above. For example, the fact that the two characters are associated with the same genre may be given quantitative weight. As another example, a similarity of attributes 160 such as, for example, similar gender and similar character type may be given quantitative weight in determining a relationship score. Thus, the relationship score may be determined based at least upon user interaction data 124, a comparison of attributes 160 between two characters, or any combination thereof.

In various embodiments, the relationship generation service 118 counts/determines those instances where a common user prefers two or more characters. To this end, relationship data 134 is dynamically updated in response to continued user interaction.

Figure 5:
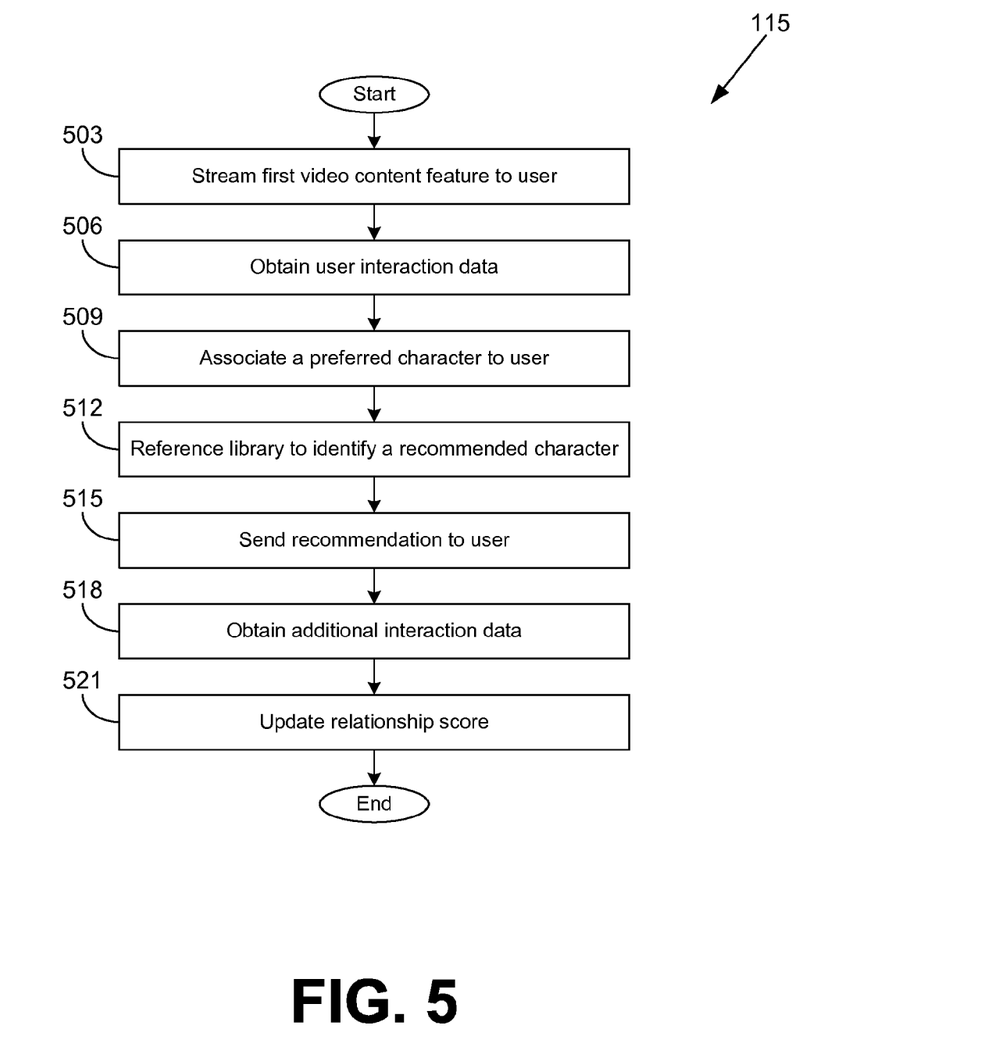
FIG. 5 is a flowchart illustrating one example of functionality implemented as portions of a content delivery service executed in a computing environment in the networked environment of FIG. 2 according to various embodiments of the present disclosure.

Referring next to FIG. 5, shown is a flowchart that provides one example of the operation of a portion of the content delivery service 115 according to various embodiments. It is understood that the flowchart of FIG. 5 provides merely an example of the many different types of functional arrangements that may be employed to implement the operation of the portion of the content delivery service 115 as described herein. As an alternative, the flowchart of FIG. 5 may be viewed as depicting an example of steps of a method implemented in the computing environment 103 (FIG. 2) according to one or more embodiments.

Beginning with box 503, the content delivery service 115 streams a first video content feature 139 (FIG. 2) to a user. The video content feature may be presented to a user via a user interface such as, for example, the user interface 200 of FIG. 3. In box 506, the content delivery service 115 obtains user interaction data 124 (FIG. 2). According to various embodiments, the content delivery service 115 obtains user interaction data 124 via a scene feedback interface 267 (FIG. 3), character feedback interface 171 (FIG. 3), actor/actress feedback interface, or any other user interface. The character feedback interface 171 may provide explicit user feedback expressing that the user favors/prefers a particular character.

In various embodiments, the user interaction data 124 comprises consumption history or browsing history data relating to a product associated with a character. In this respect, when a user interacts with a related product 163, the content delivery service 115 infers that the user favors a particular character. For example, if a user searches an electronic commerce catalog for a product, browses a network page for a product, consumes digital content, or purchases a product, then it is implied that the user favors a particular character when that product is related to the particular character.

In box 509, the content delivery service 115 associates a preferred character to the user. The content delivery service 115 may first determine that the user prefers a character based at least upon explicit user feedback expressing a preference for the character. The content delivery service 115 may also determine that the user prefers a character based at least upon implicit user interaction data 124. For example, browse history, consumption history, search history, or any action taken towards a related product 163 may imply a preference for the character. Consumption history may include a history of items purchased, a history of digital content consumed, or a history of any other commercial transaction.

In various embodiments, user feedback expressing that the user favors one or more scenes associated with content 121 may be used to determine that the user prefers a character based at least upon whether that character is in the one or more scenes. To this end, patterns in a user's scene preference may lead to a determination that the user prefers a particular character. For example, if the frequency in which a character appears in a group of user preferred scenes exceeds a predetermined threshold amount, then the content delivery service 115 identifies the character as a preferred character and then associates the preferred character to the user. The content delivery service 115 associates a preferred character to the user by storing the preferred character as user data 136 for the user. In various embodiments, the preferred character may be represented by a corresponding cast member of content that is streamed to the user.

In box 512, the content delivery service 115 references a library to identify a recommended character. The recommended character is a character who has a degree of commonality with respect to the preferred character. The recommended character may be represented by a corresponding cast member of content 121 that differs from the streamed content 121. According to various embodiments, relationship data 134 may be stored as a library of relationships between characters. A relationship between characters may be quantified as a relationship score such that the relationship score expresses a degree of commonality between two characters. To this end, a particular character may have a unique relationship score for each of a plurality of other characters.

If a relationship score associated between a first character and a second character exceeds a predetermined threshold amount, then the content delivery service 115 may determine that the second character is a recommended character if the user has explicitly or implicitly indicated a preference towards the first character, such that the first character is a preferred character. It may be the case that multiple recommended characters are identified for a particular preferred character. That is to say, if the user prefers a first character, then the content delivery service 115 may identify all those other characters that have a degree of commonality to the first character that exceeds a predetermined threshold amount.

In box 515, the content delivery service 115 sends a recommendation 126 (FIG. 2) to the user. The recommendation 126 may comprise a listing of one or more recommended characters. Additionally, the recommendation 126 may also be a recommendation to play additional content 121 or a scene that is associated with the recommended character.

In box 518, the content delivery service 115 obtains additional interaction data. The additional user interaction data relates to whether the user interacts with any of the recommended content and/or the extent to which the user interacts with any of the recommended content. Thus, the additional interaction data may indicate whether the user initiated a playback of the recommended content, whether the user completed playing the recommended content, or any other information relating to interaction with the recommended content. The additional user interaction may indicate whether the user approves or disapproves of the recommendation 126. Disapproval, for example, may be expressed as an abandonment of playing the recommended content.

In box 521, the content delivery service 115 updates the relationship score based at least upon the additional user interaction data. If the additional user interaction data indicates that the user approves of the recommendation 126, then the relationship score may be updated to reflect a relatively stronger degree of commonality between the two characters. If the additional user interaction data indicates that the user disapproves of the recommendation, then the relationship score may be updated to reflect a weaker degree of commonality between the characters.

Figure 6:
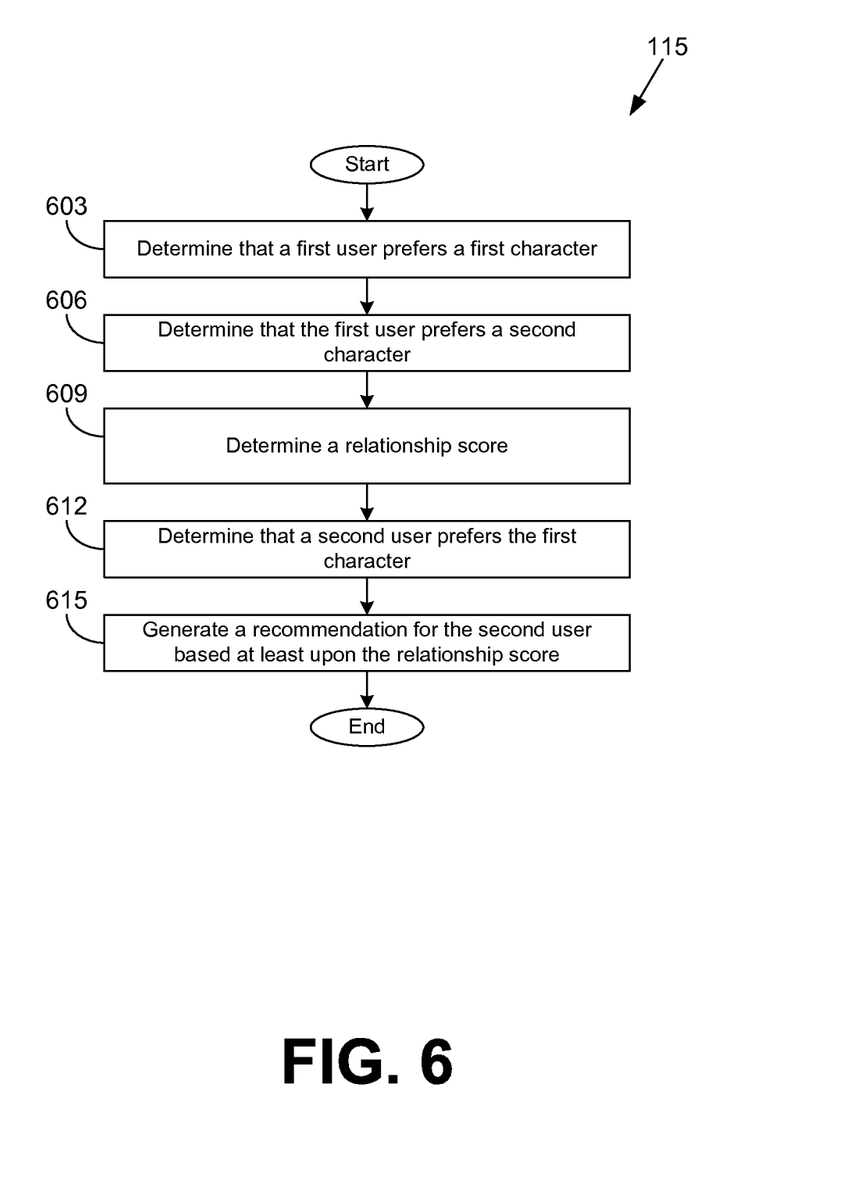
FIG. 6 is a flowchart illustrating one example of functionality implemented as portions of a content delivery service executed in a computing environment in the networked environment of FIG. 2 according to various embodiments of the present disclosure.

Continuing on to FIG. 6, shown is a flowchart that provides one example of the operation of another portion of the content delivery service 115 according to various embodiments. It is understood that the flowchart of FIG. 6 provides merely an example of the many different types of functional arrangements that may be employed to implement the operation of the portion of the content delivery service 115 as described herein. As an alternative, the flowchart of FIG. 6 may be viewed as depicting an example of steps of a method implemented in the computing environment 103 (FIG. 2) according to one or more embodiments.

Beginning with box 603 of FIG. 6, the content delivery service 115 determines that a first user prefers a first character. The content delivery service 115, for example, may analyze user interaction data 124 (FIG. 2) to determine whether the first user has implicitly or explicitly indicated that he/she prefers the first character. In box 606, the content delivery service 115 determines that the first user prefers a second character. The content delivery service 115, for example, may analyze user interaction data 124 to determine whether the first user has implicitly or explicitly indicated that he/she prefers the second character.

In box 609, the content delivery service 115 determines a relationship score. The content delivery service 115 may employ a relationship generation service 118 to determine a relationship score that quantifies a degree of commonality between the first character and the second character. In various embodiments, the relationship score may be determined by comparing a set of attributes 160 (FIG. 2) of the first character to a second set of attributes 160 of the second character. A greater number of attributes in common results in a greater relationship score.

In addition, the relationship score may be determined based at least upon the user interaction data 124. The user interaction data may indicate a quantity of users who have expressed a preference towards both the first character and the second character. The quantity may be adjusted to account for a proportion of users who have expressed a preference towards both the preferred character and the recommended character. The proportion may be made with respect to a total quantity of users, the quantity of users who favor the first character, the quantity of users who favor the second character, etc.

In box 612, the content delivery service 115 determines that a second user prefers the first character. The content delivery service 115, for example, may analyze user interaction data 124 of the second user to determine whether the second user has implicitly or explicitly indicated that he/she prefers the first character. In box 615, the content delivery service 115 generates a recommendation 126 (FIG. 2) for the second user based at least upon the relationship score. For example, if the relationship score for the first character and the second character exceeds a predetermine threshold, then a recommendation 126 may be generated. If the first character is associated with multiple relationship scores for other characters, then the content delivery service 115 may be configured to identify the highest score to generate the recommendation 126.

Figure 7:
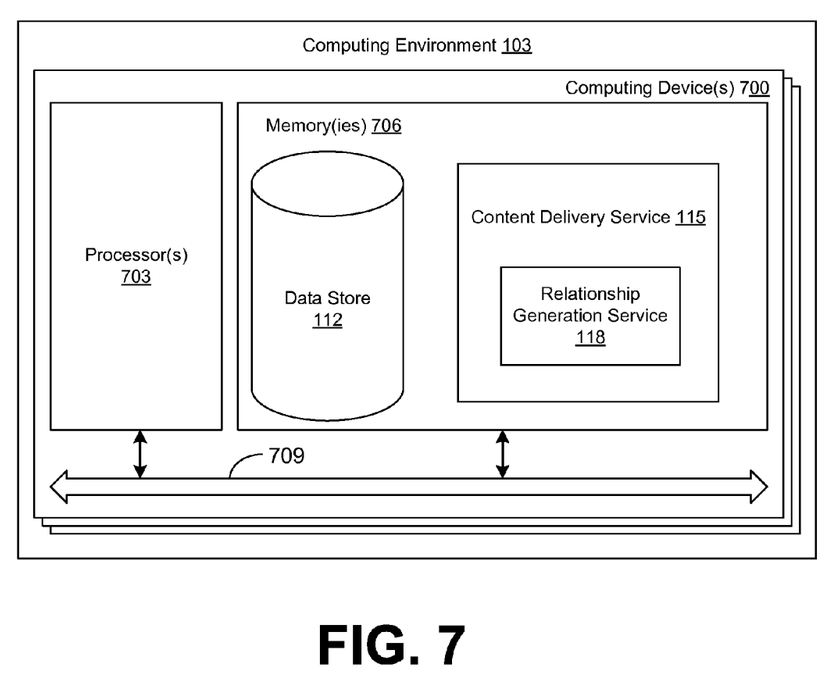
FIG. 7 is a schematic block diagram that provides one example illustration of a computing environment employed in the networked environment of FIG. 2 according to various embodiments of the present disclosure.

With reference to FIG. 7, shown is a schematic block diagram of the computing environment 103 according to an embodiment of the present disclosure. The computing environment 103 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are a content delivery service 115, a relationship generation service 118, and potentially other applications. Also stored in the memory 706 may be a data store 112 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the content delivery service 115, the relationship generation service 118, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5-6 show the functionality and operation of an implementation of portions of the content delivery service 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 5-6 show a specific order of execution, it is understood that the order of execution may differ from that which is depicted. For example, the order of execution of two or more blocks may be scrambled relative to the order shown. Also, two or more blocks shown in succession in FIGS. 5-6 may be executed concurrently or with partial concurrence. Further, in some embodiments, one or more of the blocks shown in FIGS. 5-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the content delivery service 115, the relationship generation service 118, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium having a plurality of computer instructions executable by at least one computing device, wherein, upon execution, the plurality of computer instructions cause the at least one computing device to:

stream a first video content feature from at least one server to a client associated with a user;

cause the first video content feature to be rendered in a user interface for display on the client;

obtain first user interaction data from the client based at least in part upon a first interaction with the first video content feature;

cause a timeline user interface that segments the first video content feature into a plurality of scenes to be rendered in response to obtaining the first user interaction data;

obtain second user interaction data from the client based at least in part upon a second interaction with at least one character feedback interface rendered on the timeline user interface, the at least one character feedback interface being associated with a current scene included in the plurality of scenes;

associate a preferred character with the user based at least upon the second user interaction data, the preferred character being represented by a corresponding first cast member of the first video content feature;

reference a library to identify a recommended character based at least upon the preferred character, the recommended character being represented by a corresponding second cast member of a second video content feature, the library associating the preferred character to the recommended character according to a relationship score, the relationship score being calculated based at least in part upon a proportion of users who have expressed a preference towards both the preferred character and the recommended character; and send to the user a recommendation to play the second video content feature.

2. The non-transitory computer-readable medium of claim 1, wherein the plurality of computer instructions further cause the at least one computing device to:

obtain additional user interaction data from the user based at least upon an interaction with the second video content feature; and update the relationship score based at least upon the additional user interaction data.

3. The non-transitory computer-readable medium of claim 2, wherein the additional user interaction data comprises user feedback expressing that the user favors at least one scene associated with the second video content feature.

4. The non-transitory computer-readable medium of claim 1, wherein the plurality of computer instructions further cause the at least one computing device to:

identify an attribute associated with the recommended character; and send the attribute to the client to indicate a basis for the recommendation to the user.

5. The non-transitory computer-readable medium of claim 1, wherein the user interaction data is obtained during a playback of the first video content feature via the client.

6. A system, comprising:

at least one computing device; and at least one application executable in the at least one computing device, the at least one application causing the at least one computing device to:

cause a first video content feature to be rendered in a user interface for display on a client;

determine that a user prefers a first character based at least upon a first interaction data, the first character being represented by a corresponding first cast member of the first video content feature;

cause a timeline user interface that segments the first video content feature into a plurality of scenes to be rendered in response to obtaining the first interaction data;

obtain second user interaction data from the client based at least in part upon an interaction with at least one character feedback interface rendered on the timeline user interface, the at least one character feedback interface being associated with a current scene included in the plurality of scenes;

determine that the user prefers a second character based at least upon the second interaction data, the second character being represented by a corresponding second cast member of a second video content feature;

determine a relationship score based at least upon the first interaction data and the second interaction data, the relationship score quantifying a degree of commonality between the first character and the second character and being calculated based at least in part upon a proportion of users who have expressed a preference towards both the first character and the second character; and generate a recommendation to play at least one of the first video content feature or the second video content feature based at least upon the relationship score.

7. The system of claim 6, wherein the at least one application further causes the at least one computing device to:

store a first set of attributes associated with the first character;

store a second set of attributes associated with the second character; and compare the first set of attributes to the second set of attributes.

8. The system of claim 6, wherein the first interaction data comprises explicit user feedback expressing that the user favors the first character.

9. The system of claim 6, wherein the first interaction data comprises at least one of consumption history data relating to a product associated with the first character or browse history data relating to a product associated with the first character.

10. The system of claim 6, wherein the first interaction data comprises user feedback expressing that the user favors at least one scene associated with the first video content feature, and wherein the at least one application further causes the at least one computing device to identify the first character in the at least one scene.

11. The system of claim 6, wherein the at least one application further causes the at least one computing device to generate the recommendation for another user in response to the another user specifying a preference for at least one of the first character or the second character.

12. The system of claim 11, wherein the at least one application further causes the at least one computing device to:

obtain additional user interaction data from the another user, the additional user interaction data being associated with a playback of at least one of the first video content feature or the second video content feature; and update the relationship score based at least upon the additional user interaction data.

13. The system of claim 6, wherein the relationship score is further calculated based at least in part upon a quantity of users who have expressed a preference towards both the first character and the second character.

14. A method, comprising:

causing, by at least one computing device, a first network content to be rendered in a user interface for display on a client;

obtaining, by the at least one computing device, first user interaction data from the client based at least in part upon a first interaction with the first network content;

associating, by the at least one computing device, a user with a user preferred character represented in a first network content based at least in part upon the first user interaction data;

causing, by the at least one computing device, a timeline user interface that segments the first network content into a plurality of scenes to be rendered in response to obtaining the first user interaction data;

obtaining, by the at least one computing device, second user interaction data from the client based at least in part upon a second interaction with at least one character feedback interface rendered on the timeline user interface, the at least one character feedback interface being associated with a current scene among the plurality of scenes;

referencing, by the at least one computing device, a library to identify a recommended character based at least upon the user preferred character and the second interaction data, the recommended character being represented in a second network content, the library associating the user preferred character to the recommended character according to a relationship score, the relationship score being calculated based at least in part upon a proportion of users who have expressed a preference towards both the user preferred character and the recommended character; and sending, by the at least one computing device, a recommendation for presentation of the second network content.

15. The method of claim 14, wherein the user preferred character is a preferred fictional character and wherein the recommended character is a recommended fictional character.

16. The method of claim 14, wherein the second network content comprises a video content feature, an electronic book (e-book), or an audio book.

17. The method of claim 14, wherein associating the user with the user preferred character comprises obtaining explicit user feedback expressing that the user favors the user preferred character.

18. The method of claim 14, further comprising obtaining, by the at least one computing device, user interaction data from the user based at least upon the presentation of the second network content.

19. The method of claim 18, further comprising updating, by the at least one computing device, the relationship score based at least upon the user interaction data.

20. The method of claim 14, further comprising:
storing, by the at least one computing device, a first set of attributes associated with the user preferred character; and
storing, by the at least one computing device, a second set of attributes associated with the recommended character; and
determining, by the at least one computing device, the relationship score based at least upon a comparison between the first set of attributes and the second set of attributes.

21. A non-transitory computer-readable medium having a plurality of computer instructions executable by at least one computing device, wherein upon execution, the plurality of computer instructions cause the at least one computing device to:
cause a first media content to be rendered in a user interface for display on a client;
obtain first interaction data from the client based at least upon a first interaction with the first media content;
determine that a user prefers a first fictional character based at least upon the first interaction data, the first fictional character being associated with the first media content;
cause a timeline user interface that segments the first media content into a plurality of scenes to be rendered in response to obtaining the first interaction data;
obtain second interaction data from the client based at least upon a second interaction with at least one character feedback interface rendered on the timeline user interface, the at least one character feedback interface being associated with a current scene included in the plurality of scenes;
determine that the user prefers a second fictional character based at least upon the second interaction data, the second fictional character being associated with a second media content;
determine a relationship score based at least upon the first interaction data and the second interaction data, the relationship score quantifying a degree of commonality between the first fictional character and the second fictional character and being calculated based at least in part upon a proportion of users who have expressed a preference towards both the first fictional character and the second fictional character; and
generate a recommendation to present at least one of the first media content or the second media content to another user based at least upon the relationship score.

22. The non-transitory computer-readable medium of claim 21, wherein the first media content comprises an electronic book (e-book).

23. The non-transitory computer-readable medium of claim 21, wherein the plurality of computer instructions further causes the at least one computing device to obtain explicit user feedback expressing that the user favors the first fictional character via a user interface.

24. The non-transitory computer-readable medium of claim 21, wherein the relationship score is further calculated based at least in part upon a quantity of users who have expressed a preference towards the first fictional character.

25. The non-transitory computer-readable medium of claim 21, wherein the relationship score is based at least in part upon whether the first fictional character and the second fictional character are associated with a similar genre.

* * * * *